US012612271B2

(12) United States Patent
Akkerman et al.

(10) Patent No.: US 12,612,271 B2
(45) Date of Patent: Apr. 28, 2026

(54) METHOD FOR CONTROLLING MOVEMENT OF AT LEAST ONE MOVER OVER A TRANSPORT SYSTEM

(71) Applicant: Robert Bosch GmbH, Stuttgart (DE)

(72) Inventors: André Akkerman, Best (NL); Richard Hibbs, Mierlo (NL)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 18/527,252

(22) Filed: Dec. 2, 2023

(65) Prior Publication Data

US 2024/0190670 A1 Jun. 13, 2024

(30) Foreign Application Priority Data

Dec. 8, 2022 (EP) ..................................... 22212286

(51) Int. Cl.
B65G 54/02 (2006.01)
(52) U.S. Cl.
CPC .................................... B65G 54/02 (2013.01)
(58) Field of Classification Search
CPC ........ B60L 13/03; B60L 15/005; B60L 15/38; B60L 13/08; B60L 2240/421; B60L 2240/427; B60L 2200/36; B60L 2240/423; B60L 2240/429; H02P 25/064; B65G 54/02; B65G 2203/0291; B65G 2203/0283; B65G 43/00; G05B 19/4189;

G05B 19/41855; G05B 2219/41337; G05B 2219/31281; G05B 2219/31022; G05B 2219/41295; Y02P 90/02
See application file for complete search history.

(56) References Cited

U.S. PATENT DOCUMENTS

| | | | |
|---|---|---|---|
| 5,884,746 A | 3/1999 | Leisner et al. | |
| 11,767,174 B2 * | 9/2023 | Das ........................ | B65G 43/00 |
| | | | 198/502.3 |
| 2018/0370736 A1 * | 12/2018 | Jaentsch .............. | B65G 37/005 |
| 2019/0006930 A1 * | 1/2019 | Weber .................. | H02K 41/033 |
| 2023/0322506 A1 * | 10/2023 | Forthuber .............. | B65G 54/02 |

* cited by examiner

*Primary Examiner* — Bickey Dhakal
(74) *Attorney, Agent, or Firm* — Maginot, Moore & Beck LLP

(57) ABSTRACT

A method for controlling movement of at least one mover over a transport system is disclosed. The transport system includes (i) a plurality of tiles, wherein each of the plurality of tiles respectively includes at least one actuator for moving the at least one mover over the corresponding tile, and (ii) a control unit configured to actuate the at least one actuator of the corresponding tile to control movement of the at least one mover when the at least one mover is placed over the corresponding tile. The method includes (i) for each of the at least one mover, respectively determining over which of the plurality of tiles the corresponding mover is currently placed during movement of the corresponding mover, and (ii) for each of the at least one mover, respectively controlling movement of the corresponding mover by the control units of the tiles over which the corresponding mover is currently placed.

13 Claims, 3 Drawing Sheets

METHOD FOR CONTROLLING MOVEMENT OF AT LEAST ONE MOVER OVER A TRANSPORT SYSTEM

This application claims priority under 35 U.S.C. § 119 to patent application no. EP 22212286.3, filed on Dec. 8, 2022 in Europe, the disclosure of which is incorporated herein by reference in its entirety.

The present disclosure relates to a method for controlling movement of at least one mover over a transport system and in particular a method for controlling movement of at least one mover over a transport system without a higher-level respectively centralized control of the at least one mover.

BACKGROUND

The production of goods based on at least one component, respectively the processing of the at least one component is more and more automated. Therein, a corresponding manufacturing system, respectively a processing system for processing at least one component usually comprises at least one process station, wherein each of the at least one process station is configured to perform at least one step of a processing process for processing the at least one component, and a transporting system for successively transporting the at least one component to each of the at least one process station based on corresponding specifications.

Such a transport system usually comprises at least one movement body or mover for successively moving the at least one component to each of the at least one process station based on corresponding specifications, wherein movement of the at least one mover is usually controlled by at least one control unit, and wherein movement of the at least one mover can for example be realized based on a corresponding track system or rollers attached to the at least one mover. However, the at least one control unit of the transport system is usually a higher-level or centralized control unit, what might lead to delays caused by forwarding necessary information to the centralized control unit and can therefore result in a poor control performance.

U.S. Pat. No. 5,884,746 A discloses a modular assembly line system having transport means for the transport of workpiece carriers receiving parts or components and having processing stations arranged one behind the other in the direction of conveyance, wherein the transport means have a main circulating path composed of main circulating path segments arranged one behind the other and secondary path segments which can be branched off from the main circulating path segments, and the secondary path segments each have a feed-out section and a feed-in section extending transversely to the main circulating path, a secondary transport section being arranged between feed-out section and feed-in section and extending in the direction of conveyance of the main circulating path, with the feed-out section and the feed-in section having opposite directions of conveyance and with the main circulating path segments and/or the secondary path segments accommodating at least one processing station. The feed-out section is configured as a feed-out module and the feed-in section as a feed-in module, which can respectively be coupled in between two main circulating path segments arranged one behind the other. The secondary transport section is configured as at least one station module that can be inserted between the feed-out module and the feed-in module.

It is an object of the present disclosure to provide an improved transport system for transporting at least one mover over the transport system.

This object is solved by the method for controlling movement of at least one mover over a transport system as described below.

This object is further solved by the transport system for moving at least one mover as described below.

SUMMARY

According to one embodiment of the disclosure, this object is solved by a method for controlling movement of at least one mover over a transport system, wherein the transport system comprises a plurality of tiles, wherein each of the plurality of tiles respectively includes at least one actuator for moving the at least one mover over the corresponding tile and a control unit, wherein the control unit is configured to actuate the at least one actuator of the corresponding tile to control movement of the at least one mover when the at least one mover is placed over the corresponding tile, and wherein the method comprises, during movement of each of the at least one mover over the transporting system, respectively determining over which of the plurality of tiles the corresponding mover is currently placed, and respectively controlling movement of the corresponding mover by the controllers of the tiles over which the corresponding mover is currently placed.

Here, a tile is a part of the transport system, for example a track system, or a system on which rollers attached to the at least one mover are placed, wherein the tiles of the plurality of tiles are connected in such a way, that a continuous transport system is formed.

Thus, the method is based on control units respectively associated with individual tiles of the plurality of tiles, wherein movement of a mover at a particular time is respectively controlled by the control units of the tiles over which the corresponding mover is placed at the particular time. In particular, if the corresponding mover is fully placed over a tile at the particular time, movement of the corresponding mover is only controlled by the control unit of this tile, whereas for example if a first part of the corresponding mover is placed over a first tile and a second part of the corresponding mover is placed over a second tile at the particular time, control of the corresponding mover is shared between the control unit of the first tile and the control unit of the second tile.

Thereby, delays caused for example due to signals travelling to a centralized control unit, and therefore, latencies and/or poor control performance can be avoided.

Therefore, an improved method for transporting at least one mover over the transport system is provided.

Therein, the step of, for each of the at least one mover, controlling movement of the corresponding mover by the control units of the tiles over which the corresponding mover is currently placed can respectively comprise controlling movement of the corresponding mover by the control units of the tiles over which the corresponding mover is currently placed based on the same control algorithm.

Here, a control algorithm is an algorithm that is used by a control unit of a tile to control movement of a mover over the corresponding tile.

Thereby, the control performance can be further improved, and delays avoided, as for example no additional transformation or verification steps are required when a mover is placed over more than one tile and movement of the mover is correspondingly controlled by more than one control unit.

The method can further comprise, for each of the at least one mover, respectively determining over which of the plurality of tiles the corresponding mover will be placed next during movement of the corresponding mover over the transporting system, and respectively synchronizing information between the control units of the tiles over which the corresponding mover is currently placed and the control units of the tiles over which the corresponding mover will be placed next.

Here, the tiles over which a mover will be placed next is the tile immediately subsequent to the tile over which the mover is currently placed, respectively the very next tile over which the mover will be placed in case movement of the mover is regularly continued.

That information, for example movement and/or position information is synchronized between control units means that the corresponding information is exchanged between the corresponding control units.

Thereby, no centralized or high-level order control unit that takes care of the synchronization of information is required, and possible delays due to a necessary synchronization, respectively a necessary exchange of information can be significantly reduced.

The method can also comprise, for each of the plurality of tiles, respectively initializing the control unit of the corresponding tile based on a position of the at least one mover.

That a control unit is initialized means that the control unit is woken up in such a way, that the control unit can receive data from another control unit and, in particular, that data exchange between the control unit of tile over which at least one of the at least one mover is currently placed and the control unit of the tile over which the corresponding mover will be placed next is started, respectively that the control unit of the tile over which a mover will be placed next starts collecting information about the corresponding mover, for example position information.

Thereby, it can be ensured that the control unit of the tile over which a mover will be placed next starts collecting information about the mover in a timely manner, whereby possible delays due to a necessary synchronization, respectively a necessary exchange of information can be further reduced.

Further, the method can also comprise exchanging position information of the at least one mover between the plurality of tiles.

Here, position information of a mover is information about a current position, respectively a current location of the mover.

Thereby, the respective control units can easily determine when a mover will be placed over a corresponding tile, and therefore, when the corresponding control unit should take over control of the movement of the mover.

Also, the same system of movement coordinates can be assigned to each of the actuators of the plurality of tiles.

Here, a movement coordinate is a degree of freedom, respectively a basic way a mover can move through the three-dimensional (3D) space. The system of movement coordinates assigned to an actuator further defines the entirety of degrees of freedom regarding movement of the at least one mover by the corresponding actuator. For example, there can be six degrees of freedom regarding movement of the at least one mover over a tile, in particular three translational degrees of freedom and three rotational degrees of freedom, or two degrees of freedom regarding movement of the at least one mover over a tile, in particular a translational degree of freedom and a rotational degree of freedom.

That the same system of movement coordinates is assigned to all actuators of the corresponding transport system has the advantage, that control of the movement of the at least one mover, and therefore, the control performance can be further increased.

In one embodiment, the actuators of the plurality of tiles respectively include at least one electric solenoid actuator.

Here, an electric solenoid actuator is an electromagnetic device that is used to supply remote working movement in order to switch, move or otherwise activate a secondary mechanism.

Such electric solenoid actuators are simple, reliable devices that have only one moving part.

However, that the actuators of the plurality of tiles respectively include at least one electric solenoid actuator should merely be understood as a possible embodiment and the actuators can be configured to move the at least one mover in another way, for example based on rollers attached to the at least one mover, too.

According to another embodiment of the disclosure, a transport system for moving at least one mover is provided, wherein the transport system comprises a plurality of tiles, wherein each of the plurality of tiles respectively includes at least one actuator for moving the at least one mover over the corresponding tile and a control unit, wherein the control unit is configured to actuate the at least one actuator of the corresponding tile to control movement of the at least one mover when the at least one mover is placed over the corresponding tile, wherein the transport system further comprises a first determining unit, wherein the first determining unit is configured to, for each of the at least one mover, respectively determine over which of the plurality of tiles the corresponding mover is currently placed during movement of the corresponding mover over the transporting system, and wherein the transport system is configured in such a way, that, for each of the at least one mover, movement of the corresponding mover is respectively controlled by the control units of the tiles over which the corresponding mover is currently placed.

Thus, an improved transport system for transporting at least one mover is provided. The system is based on control units respectively associated with individual tiles of the plurality of tiles, wherein movement of a mover at a particular time is respectively controlled by the control units of the tiles over which the corresponding mover is placed at the particular time. In particular, if the corresponding mover is fully placed over a tile at the particular time, movement of the corresponding mover is only controlled by the control unit of this tile, whereas for example if a first part of the corresponding mover is placed over a first tile and a second part of the corresponding mover is placed over a second tile at the particular time, control of the corresponding mover is shared between the control unit of the first tile and the control unit of the second tile. Thereby, delays caused for example due to signals travelling to a higher-level control unit, and therefore, latencies and/or poor control performance can be avoided.

Therein, for each of the at least one mover, the control units of the plurality of tiles over which the corresponding mover is currently placed can respectively be configured to control movement of the corresponding mover based on the same control algorithm. Thereby, the control performance can be further improved, and delays avoided, as for example no additional transformation or verification steps are required when a mover is placed over more than one tile and movement of the mover is correspondingly controlled by more than one control unit.

The transport system can further comprise at least one second determining means, wherein the at least one second determining means is configured to, for each of the at least one mover, respectively determine over which of the plurality of tiles the corresponding mover will be placed next during movement of the corresponding mover over the transporting system, and a synchronizing unit, wherein the synchronizing unit is configured to, for each of the at least one mover, respectively synchronize information between the control units of the tiles over which the corresponding mover is currently placed and the control units of the tiles over which the corresponding mover will be placed next. Thereby, no centralized or high-level order control unit that takes care of the synchronization of information is required, and delays due to a necessary synchronization, respectively a necessary exchange of information can be significantly reduced.

The control units of the plurality of tiles can also respectively comprise an initializing unit, wherein the initializing units are respectively configured to, for each of the plurality of tiles, initialize the control unit of the corresponding tile based on a position of the at least one mover. Thereby, it can be ensured that the control unit of the tile over which a mover will be placed next starts collecting information about the mover in a timely manner, whereby possible delays due to a necessary synchronization, respectively a necessary exchange of information can be further reduced.

Further, the transport system can further comprise at least one exchanging unit, wherein the at least one exchanging unit is configured to exchange position information of the at least one mover between the plurality of tiles. Thereby, the respective control units can easily determine when a mover will be placed over a corresponding tile, and therefore, when the corresponding control unit should take over control of the movement of the mover.

Also, the same system of movement coordinates can be assigned to each of the actuators of the plurality of tiles. That the same system of movement coordinates is assigned to all actuators of the corresponding transport system has the advantage, that control of the movement of the at least one mover, and therefore, the control performance can be further increased.

In one embodiment, the actuators of the plurality of tiles respectively include at least one electric solenoid actuator. Such electric solenoid actuators are simple, reliable devices that have only one moving part.

However, that the actuators of the plurality of tiles respectively include at least one electric solenoid actuator should merely be understood as a possible embodiment and the actuators can be configured to move the at least one mover in another way, for example based on rollers attached to the at least one mover, too.

According to still another embodiment of the disclosure, a processing system for processing at least one component is provided, wherein the processing system comprises at least one process station, wherein each of the at least process station is configured to perform at least one step of a processing process for processing the at least one component, and a transport system for moving at least one mover as described above, wherein the at least one mover is configured to transport the at least one component to each of the at least one process station.

Thus, a processing system is provided that is based on an improved transport system for transporting at least one mover. The transport system is based on control units respectively associated with individual tiles of the plurality of tiles, wherein movement of a mover at a particular time is respectively controlled by the control units of the tiles over which the corresponding mover is placed at the particular time. In particular, if the corresponding mover is fully placed over a tile at the particular time, movement of the corresponding mover is only controlled by the control unit of this tile, whereas for example if a first part of the corresponding mover is placed over a first tile and a second part of the corresponding mover is placed over a second tile at the particular time, control of the corresponding mover is shared between the control unit of the first tile and the control unit of the second tile. Thereby, delays caused for example due to signals travelling to a higher-level control unit, and therefore, latencies and/or poor control performance can be avoided.

BRIEF DESCRIPTION OF THE DRAWINGS

Embodiments of the disclosure will now be described in further detail with reference to the attached drawings, in which.

DETAILED DESCRIPTION

Figure 1:
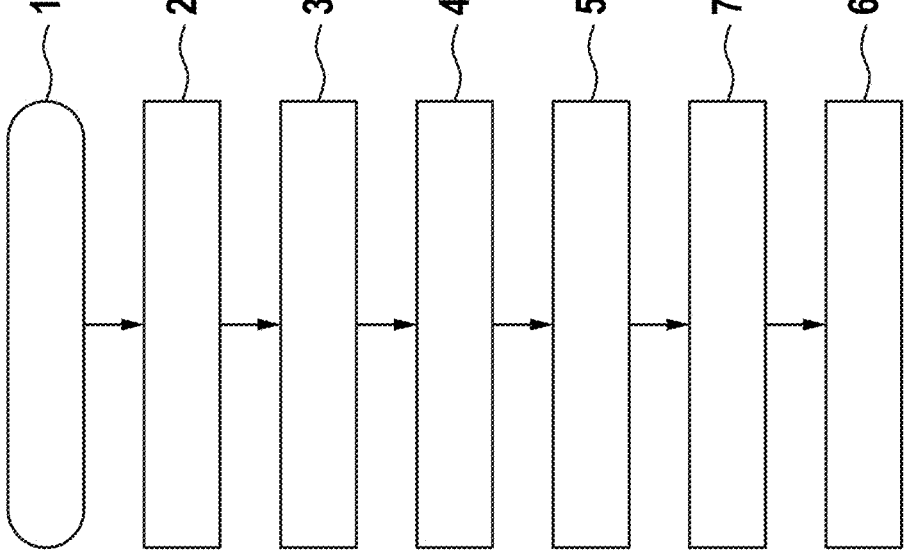
FIG. 1 illustrates a method for controlling movement of at least one mover over a transport system, according to embodiments of the disclosure.

FIG. 1 illustrates a method for controlling movement of at least one mover over a transport system 1, according to embodiments of the disclosure.

The production of goods based on at least one component, respectively the processing of the at least one component is more and more automated. Therein, a corresponding manufacturing system, respectively a processing system for processing at least one component usually comprises at least one process station, wherein each of the at least one process station is configured to perform at least one step of a processing process for processing the at least one component, and a transporting system for successively transporting the at least one component to each of the at least one process station based on corresponding specifications.

Such a transport system usually comprises at least one movement body or mover for successively moving the at least one component to each of the at least one process station based on corresponding specifications, wherein movement of the at least one mover is usually controlled by at least one control unit, and wherein movement of the at least one mover can for example be realized based on a corresponding track system or rollers attached to the at least one mover. However, the at least one control unit of the transport system is usually a higher-level or centralized control unit, what might lead to delays caused by forwarding necessary information to the centralized control unit and can result in a poor control performance.

FIG. 1 shows a method for controlling movement of at least one mover over a transport system 1, wherein the transport system comprises a plurality of tiles, wherein each of the plurality of tiles respectively includes at least one actuator for moving the at least one mover over the corresponding tile and a control unit, wherein the control unit is configured to actuate the at least one actuator of the corresponding tile to control movement of the at least one mover over the corresponding tile, and wherein the method 1 comprises a step 2 of, for each of the at least one mover, determining over which of the plurality of tiles the corresponding mover is currently placed during movement of the corresponding mover over the transporting system, and a step 3 of, for each of the at least one mover, controlling movement of the corresponding mover by the control units of the tiles over which the at corresponding mover is currently placed.

Thus, the method 1 is based on control units respectively associated with individual tiles of the plurality of tiles, wherein movement of a mover at a particular time is respectively controlled by the control units of the tiles over which the corresponding mover is placed at the particular time. In particular, if the corresponding mover is fully placed over a tile at the particular time, movement of the corresponding mover is only controlled by the control unit of this tile, whereas for example if a first part of the corresponding mover is placed over a first tile and a second part of the corresponding mover is placed over a second tile at the particular time, control of the corresponding mover is shared between the control unit of the first tile and the control unit of the second tile.

Thereby, delays caused for example due to signals forwarded to respectively travelling to a centralized control unit, and therefore, corresponding latencies and/or poor control performance can be avoided.

Therefore, an improved method for transporting at least one mover over a transport system 1 is provided.

In particular, FIG. 1 shows a method 1, wherein controller dependency of a mover is migrated based on the physical location of the mover.

Therein, for example if a first part of a mover is placed over a first tile and a second part of the corresponding mover is placed over a second tile at a particular time, the control unit of the first tile correspondingly actuates the at least one actuator of the first tile and, at the same time, the control unit of the second tile correspondingly actuates the at least one actuator of the second tile, and wherein each control unit is only able to actuate the actuators that are part of its own tile hardware, respectively of the same tile.

The control units of the plurality of tiles can respectively be a PID controller, wherein for example data that has been gathered shortly before a mover is placed over the corresponding tile can be used to determine an output signal for controlling the corresponding at least one actuator based on a corresponding control algorithm.

According to the embodiments of FIG. 1, the step 3 of, for each of the at least one mover, respectively controlling movement of the corresponding mover by the control units of the tiles over which the corresponding mover is currently placed respectively comprises controlling movement of the corresponding mover by the control units of the tiles over which the corresponding mover is currently placed based on the same control algorithm.

In particular, according to the embodiments of FIG. 1, all control units of the plurality of tiles use the same control algorithm. Thus, when a mover is controlled by more than one control unit respectively tile controller at the same time, each of these control units performs exactly the same control calculations for this mover.

As shown in FIG. 1, the method further comprises a step 4 of, for each of the at least one mover, respectively determining over which of the plurality of tiles the corresponding mover will be placed next during movement of the corresponding mover over the transporting system, and a step 5 of, for each of the at least one mover, synchronizing information between the control units of the tiles over which the corresponding mover is currently placed and the control units of the tiles over which the corresponding mover will be placed next.

In particular, the corresponding control units can be time synchronized, wherein it can be ensured that, when the control unit of the next tile starts actuating the at least one actuator of the next tile, the control unit of the next tile has the same setpoint information as the control unit of the tile over which the corresponding mover is currently placed, that both control units use the same position information of the mover, and that the information, respectively data gathered shortly, present in one of the control units is exactly the same as the information, respectively data gathered shortly, present in the other one of the control units.

As shown in FIG. 1, the method 1 further comprises a step 6 of, for each of the plurality of tiles, respectively initializing the control unit of the corresponding tile based on a position of the at least one mover.

Therein, initializing can comprise waking up the control unit of a tile from the stand-by unit and, in particular, starting to exchange data between the control unit of tile over which a mover is currently placed and the control unit of the tile over which the mover will be placed next, respectively that the control unit of the tile over which a mover will be placed next starts collecting information about the mover, for example position information.

The shown method 1 further comprises a step 7 of exchanging position information of the at least one mover between the control units of the plurality of tiles.

Further, the same system of movement coordinates is assigned to each of the actuators of the plurality of tiles.

In particular, according to the embodiments of FIG. 1, there is a common system of movement coordinates, wherein each tile, respectively the control unit of the corresponding tile knows its place in this coordinate system in six degrees of freedom.

According to the embodiments of FIG. 1, the actuators of the plurality of tiles further respectively include at least one electric solenoid actuator.

Figures 2A, 2B, 2C:
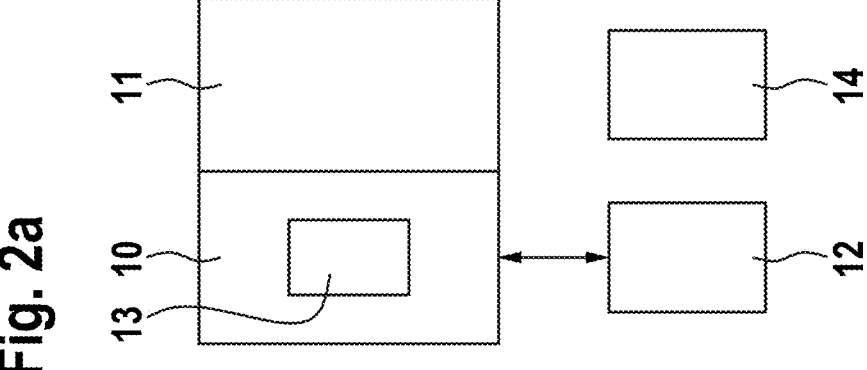
FIG. 2a-c illustrate the step of, for each of the at least one mover, respectively controlling movement of the corresponding mover by the control units of the tiles over which the corresponding mover is currently placed, according to embodiments of the disclosure.

FIG. 2a-c illustrate the step of, for each of the at least one mover, respectively controlling movement of the corresponding mover by the control units of the tiles over which the corresponding mover is currently placed, according to embodiments of the disclosure.

In particular, FIG. 2a-c respectively illustrate a first tile 10 and a subsequent second tile 11, wherein the second tile 11 is connected to the first tile 10, wherein the first tile 10 comprises at least one actuator and a control unit 12 that is configured to actuate the at least one actuator of the first tile 10 to control movement of a mover 13 over the first tile 10, and wherein the second tile comprises at least one actuator and a control unit 14 that is configured to actuate the at least one actuator of the second tile 11 to control movement of the mover over the second tile 11.

FIG. 2a illustrates a situation, in which the mover 13 is placed fully over the first tile 10, wherein movement of the mover 13 is only controlled by the control unit 12 of the first tile 10. The control unit 14 of the second tile 11 can, however, already be in the process of synchronizing with the control unit 12 of the first tile 10.

FIG. 2b illustrates a situation, in which a first part of the mover 15 is already placed over the second tile 11, whereas a second part of the mover 16 is still placed over the first tile 10. In this situation, movement of the first part of the mover 15 is controlled by the control unit of the second tile 11 after the initialization of the control unit of the second tile 11, whereas movement of the second part of the mover 16 is still controlled by the control unit 12 of the first tile 10.

FIG. 2c illustrates a situation, in which the mover 13 is placed fully over the second tile 11, wherein movement of the mover 13 is only controlled by the control unit 14 of the second tile 11.

Figure 3:
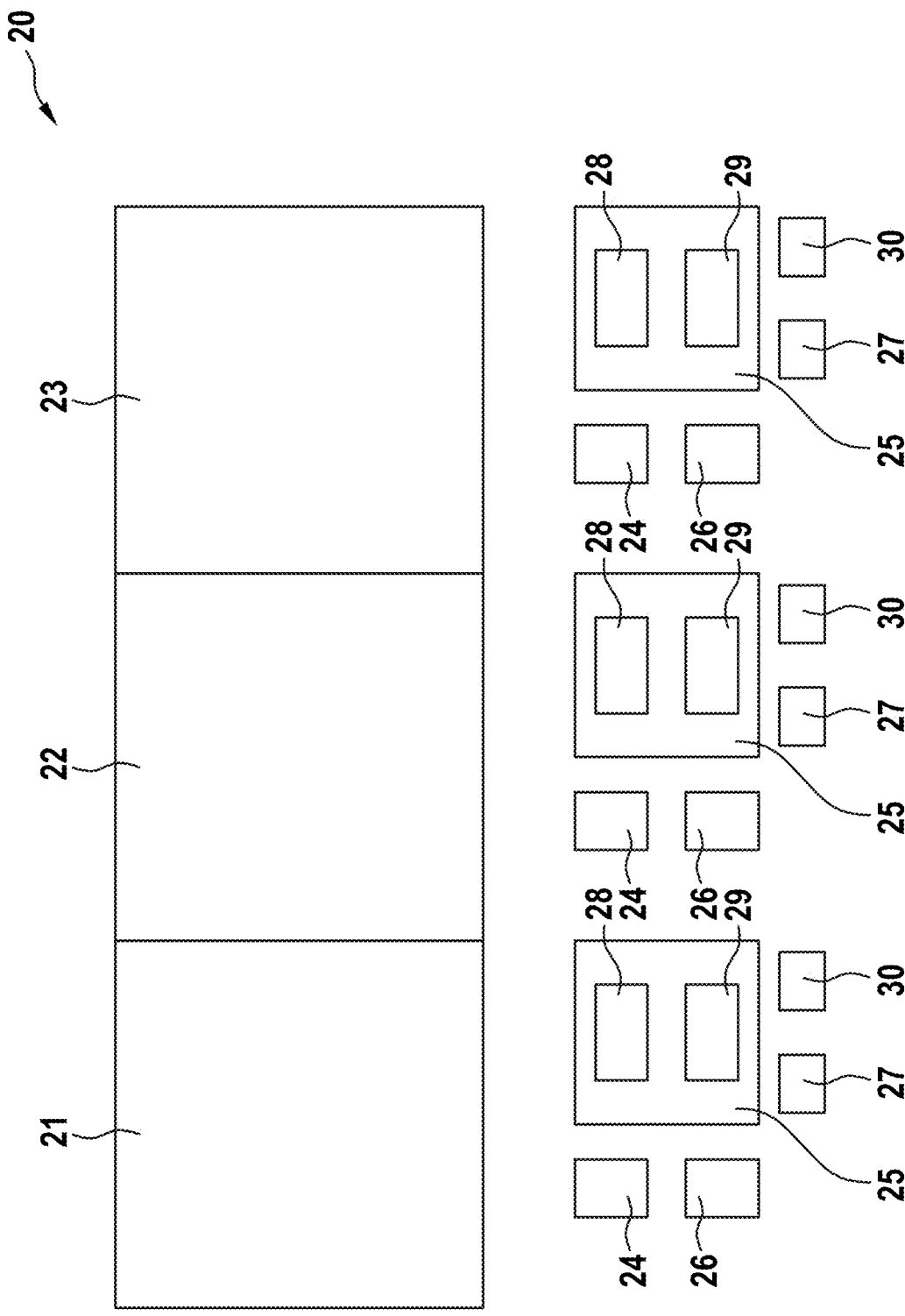
FIG. 3 illustrates a transport system for moving at least one mover according to embodiments of the disclosure.

FIG. 3 illustrates a transport system for moving at least one mover 20 according to embodiments of the disclosure.

As shown in FIG. 3, the transport system 20 comprises a plurality of tiles 21, 22, 23, wherein each of the plurality of tiles 21, 22, 23 respectively includes at least one actuator 24 for moving the at least one mover over the corresponding tile 21, 22, 23 and a control unit 25, wherein the control unit 25 is configured to actuate the at least one actuator 24 of the corresponding tile 21, 22, 23 to control movement of the at least one mover over the corresponding tile 21, 22, 23, wherein the transport system 20 further comprises first determining units 26, wherein the first determining units 26 are respectively configured to, for each of the at least one mover, determine over which of the plurality of tiles 21, 22, 23 the corresponding mover is currently placed during movement of the at least one mover over the transport system 20, and wherein the transport system 20 is configured in such a way, that, for each of the at least one mover, movement of the corresponding mover is controlled by the control units 25 of the tiles 21, 22, 23 over which the corresponding mover is currently placed.

Therein, the control unit can for example respectively be a PID controller. Further, the at least one first determining unit can for example be realized based on sensor boards of the plurality of tiles, wherein each of the plurality of tiles comprises a sensor board, and wherein the sensor boards are respectively configured to acquire movers in the vicinity of the corresponding sensor board. However, there might also be one first determining unit to determine the position of the at least one mover and to send the corresponding position information to several tiles.

According to the embodiments of FIG. 3, the control units 25 of the plurality of tiles 21, 22, 23 are further again respectively configured to, for each of the at least one mover, control movement of the corresponding mover based on the same control algorithm.

The shown transport system 20 further comprise second determining units 27, wherein the second determining units 27 are respectively configured to, for each of the at least one mover, determine over which of the plurality of tiles 21, 22, 23 the corresponding mover will be placed next during movement of the corresponding mover over the transporting system 20, wherein the control units 25 respectively comprise a synchronizing unit 28, wherein the synchronizing units 28 are respectively configured to, for each of the at least one mover, synchronize information between the control units 25 of the tiles 21, 22, 23 over which the corresponding mover is currently placed and the control units 25 of the tiles 21, 22, 23 over which the corresponding mover will be placed next.

Therein, the second determining units can again for example be realized based on sensor boards of the plurality of tiles, wherein each of the plurality of tiles comprises a sensor board, and wherein the sensor boards are respectively configured to acquire movers in the vicinity of the corresponding sensor board. However, there might also be one second determining unit to determine the position of the at least one mover and to send the corresponding position information to several tiles.

Further, the synchronizing units can for example respectively be realized based on code that is stored in a memory and executable by a processor, wherein the code can for example respectively be stored in the control units of the plurality of tiles.

As shown in FIG. 3, the control units 25 further respectively comprise an initializing unit 29, wherein the initializing units 29 are respectively configured to, for each of the plurality of tiles 21, 22, 23, respectively initialize the control unit 25 of the corresponding tile 21, 22, 23 based on a position of the at least one mover.

The shown transport system 20 further comprises exchanging units 30, wherein the at exchanging units 30 are respectively configured to exchange position information of the at least one mover between the control units 25 of the plurality of tiles 21, 22, 23.

Therein, the exchanging units can again for example be realized based on sensor boards of the plurality of tiles, wherein each of the plurality of tiles comprises a sensor board, and wherein the sensor boards are respectively configured to acquire movers in the vicinity of the corresponding sensor board. However, there might also be one exchanging unit to determine the position of the at least one mover and to send the corresponding position information to several tiles.

Further, the exchanging unit and/or the second determining unit can also be integrated into the first determining unit.

Furthermore, the same system of movement coordinates is assigned to each of the actuators 24 of the plurality of tiles 21,22,23.

According to the embodiments of FIG. 3, the actuators 24 of the plurality of tiles 21,22,23 further respectively include at least one electric solenoid actuator.

Further, the shown transport system 20 is configured to execute a method for controlling movement of at least one mover over a transport system as described above.

What is claimed is:

1. A method for controlling movement of at least one mover over a transport system, wherein the transport system comprises a plurality of tiles, each of which respectively includes (i) at least one actuator for moving the at least one mover over the corresponding tile, and (ii) a control unit configured to actuate the at least one actuator of the corresponding tile to control movement of the at least one mover when the at least one mover is placed over the corresponding tile, the method comprising:

for each of the at least one mover, respectively determining at least one tile of the plurality of tiles over which the corresponding mover is currently placed during movement of the corresponding mover;

for each of the at least one mover, respectively controlling movement of the corresponding mover by the control unit of each of the at least one tile over which the corresponding mover is currently placed;

for each of the at least one mover, respectively determining over which of the plurality of tiles the corresponding mover will be placed next during movement of the corresponding mover over the transporting system; and for each of the at least one mover, respectively synchronizing information between the control units of the tiles over which the corresponding mover is currently placed and the control units of the tiles over which the corresponding mover will be placed next.

2. The method according to claim 1, wherein:

for each of the at least one mover, the step of controlling movement of the corresponding mover by the controllers of the tiles over which the corresponding mover is currently placed respectively comprises controlling movement of the corresponding mover by the control units of the tiles over which the corresponding mover is currently placed based on the same control algorithm.

3. The method according to claim 1, further comprising: for each of the plurality of tiles, respectively initializing the control unit of the corresponding tile based on a position of the at least one mover.

4. The method according to claim 1, further comprising: exchanging position information of the at least one mover between the control units of the plurality of tiles.

5. The method according to claim 1, wherein the same system of movement coordinates is assigned to each of the actuators of the plurality of tiles.

6. The method according to claim 1, wherein the actuators of the plurality of tiles respectively include at least one electric solenoid actuator.

7. A transport system for moving at least one mover, comprising:
   a plurality of tiles, each of which respectively comprises:
      at least one actuator for moving the at least one mover over the corresponding tile;
      a control unit configured to actuate the at least one actuator of the corresponding tile to control movement of the at least one mover over the corresponding tile; and
   at least one first determining unit configured to, for each of the at least one mover, respectively determine over which of the plurality of tiles the corresponding mover is currently placed during movement of the corresponding mover over the transporting system; and
   at least one second determining unit configured to, for each of the at least one mover, respectively determine over which of the plurality of tiles the corresponding mover will be placed next during movement of the corresponding mover over the transporting system, wherein:
   the transport system is configured so that, for each of the at least one mover, movement of the corresponding mover is respectively controlled by the control units of the tiles over which the corresponding mover is currently placed,
   the control units of the plurality of tiles respectively include a synchronizing unit, and the synchronizing units are respectively configured to, for each of the at least one mover, respectively synchronize information between the control units of the tiles over which the corresponding mover is currently placed and the control units of the tiles over which the corresponding mover will be placed next.

8. The transport system according to claim 7, wherein: for each of the at least one mover, the control units of the plurality of tiles over which the corresponding mover is currently placed are respectively configured to control movement of the corresponding mover based on the same control algorithm.

9. The transport system according to claim 7, wherein: the control units of the plurality of tiles are respectively configured to, for each of the plurality of tiles, initialize the control unit of the corresponding tile based on a position of the at least one mover.

10. The transport system according to claim 7, wherein: the transport system further comprises at least one exchanging unit, and the at least one exchanging unit is configured to exchange position information of the at least one mover between the control units of the plurality of tiles.

11. The transport system according to claim 7, wherein the same system of movement coordinates is assigned to each of the actuators of the plurality of tiles.

12. The transport system according to claim 7, wherein the actuators of the plurality of tiles respectively include at least one electric solenoid actuator.

13. A processing system for processing at least one component, comprising:
   at least one process station, wherein each of the at least process station is configured to perform at least one step of a processing process for processing the at least one component; and
   a transport system for moving at least one mover according to claim 7,
   wherein the at least one mover is configured to transport the at least one component to each of the at least one process station.

* * * * *